United States Patent Office 2,860,335
Patented Nov. 11, 1958

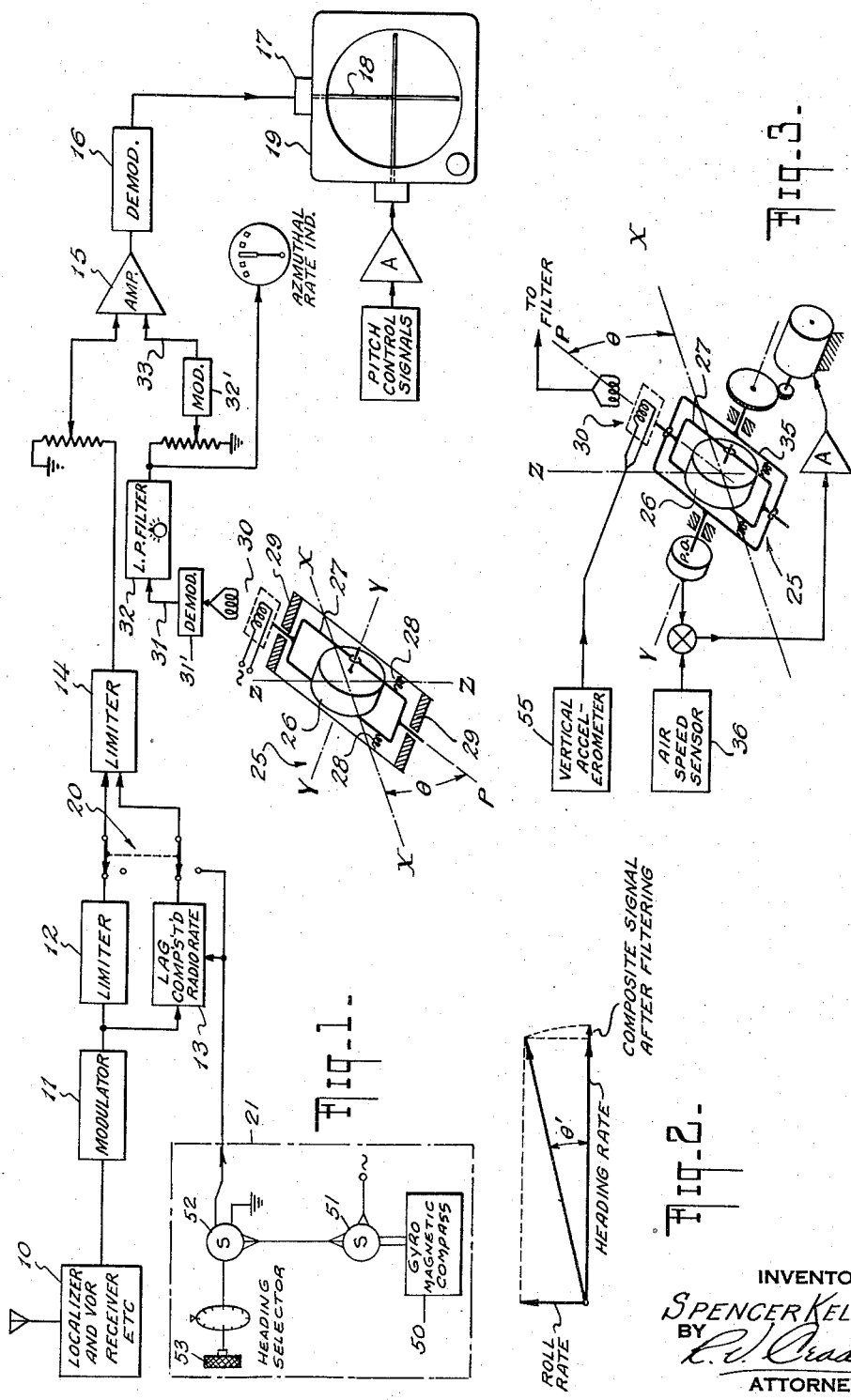

2,860,335

AIRCRAFT NAVIGATION SYSTEMS

Spencer Kellogg 2nd, Glen Head, N. Y., assignor to Sperry Rand Corporation, a corporation of Delaware Application August 31, 1955, Serial No. 531,673

7 Claims. (Cl. 343—107)

The present invention relates generally to aircraft navigation systems and more particularly to such systems by means of which a craft may be controlled so as to seek and thereafter to be maintained on a prescribed or preselected flight path.

The invention disclosed herein is concerned with a system of the character broadly set forth in my U. S. Patents 2,613,350 and 2,613,352, issued on October 7, 1952, and also in a copending application Serial No. 336,668, filed February 13, 1953, in the names of N. A. Hassler, H. R. Jurman and C. F. Fragola, now U. S. Patent No. 2,776,428 issued January 1, 1957, which patents are assigned to the same assignee as my present invention.

In my patents is disclosed a navigation system by means of which a craft may be controlled, in one mode of operation thereof, to seek or turn toward a preselected heading from an existing heading and thereafter to be maintained on said preselected heading, wherein the craft is controlled in accordance with the algebraic sum of signals representative respectively of the angular displacement between the existing heading of the aircraft and the preselected heading and a signal proportional to the roll angle or the roll attitude of the craft, the former signal being proportional to a displacement term and the latter signal being proportional to the rate of change of such displacement, whereby if the algebraic sum of these two signals is maintained substantially at zero, an asymptotic approach to the selected heading will be executed. In another mode of operation of a navigation system disclosed in my above-noted patents the craft may be controlled so as to seek a radio-defined course or flight path wherein the craft is controlled in accordance with the algebraic sum of signals representative of the displacement of a directional craft from the radio beam as may be measured by means of a suitable radio receiver, a heading error signal representative of the angle between the heading of the aircraft with respect to the compass bearing of the beam which may be produced for example by means of a stabilized magnetic compass, and a signal proportional to the roll angle or roll attitude of the craft as produced for example by means of a vertical gyroscope. These three signals are respectively proportional to the displacement, rate, and acceleration of the craft with respect to the radio beam. As described therein, the combined radio displacement and radio rate signals serve to provide an asymptotic approach to the beam while the acceleration signal serves to provide anticipation for enabling the craft to be maintained on the asymptotic aproach when the same is controlled in accordance with the combined signals. In the above-mentioned Hassler et al. patent there is disclosed a system of this general character wherein the rate and acceleration signals are derived directly from the radio displacement signal rather than from the compass and vertical gyro as in the patents, thus improving the performance of the craft under adverse wind conditions and under varying sensitivities of the beam displacement signal, i. e. whether the aproach is being made at a distance far away from the radio transmitter or close thereto and also under conditions wherein the radio displacement signal is subject to ramdom perturbations caused by bends therein due to local geography, etc.

In the above-mentioned Hassler et al. patent a system is disclosed by means of which a noisy signal or randomly fluctuating signal may be smoothed by passing the signal through a smoothing circuit such as, for example, a low pass filter and wherein means are provided for compensating for the phase lag brought about by such a filter such that the higher derivatives subsequently derived from the smoothed version of the noisy signal has substantially the proper 90° and 180° phase relation with respect to the noisy displacement signal itself. Several forms of apparatus for accomplishing the above are set forth in this patent and it is the object of the present invention to provide another form of apparatus for deriving a smoothed version of an inherently noisy signal, particularly a smooth beam acceleration signal for use in a system of the above character.

It is the principal object of the present invention to provide a simplified flight navigation system of the character set forth in the above noted patents which effects not only a reduction in the cost, weight, and size of the equipment, but also an improvement in the performance thereof.

In the above-noted patents a roll displacement signal is used as an approximation for a craft rate of turn signal which signal, in turn, is proportional to the acceleration of the craft toward a radio beam defined flight path. However, by replacing the vertical gyro with rate of turn gyro, a rate of turn signal may be directly obtained and this signal will be correct regardless of craft airspeed. However, it is known that the output of a rate of turn gyro is inherently noisy unless heavily damped, i. e. it is subject to random perturbations brought about primarily by wind gusts acting on the craft. Heretofore these random perturbations have been considerably reduced by heavily damping the rate gyro or by increasing the retraint imposed about the gyro precession axis. However, this means of removing unwanted noise in the gyro output results in a decreased sensitivity or response of the gyro to craft turning rates. Another method of removing the noise from the rate of turn signal would be to pass the signal through a filter network, such as a low pass filter, which tends to pass only the low frequency components of the signal while attenuating the undesired high frequency components thereof. However, such filtering technique imposes a lag in the signal, and, unless compensated, the rate of turn signal will not be in the proper phase relation with the radio displacement signal and/or the radio rate signal. In order to compensate for the lag in the signal produced by such filtering, the technique of rate compensation as set forth in the above-noted patent application is employed. In accordance with the teaching of the present invention a signal proportional to roll rate is provided. This roll rate signal is proportional to the first derivative of rate of turn, i. e. it leads the rate of turn signal by 90°. Thus by selecting the proper amount of lead signal, the combination thereof with the noisy signal will produce a resultant or net signal that leads the noisy signal by the amount of the lag anticipated as a result of the filtering or smoothing process. In this manner a smooth output signal, in the present case a smooth rate of turn signal that is substantially in the proper phase relation with respect to the other signals in the system will be obtained.

A further object of the present invention is to provide means for deriving a craft rate of turn signal which is characterized by its high response to craft rates of turn and at the same time has a high degree of stability.

It is a further object of the present invention to provide a rate of turn signal which is derived from signal components proportional to craft rate of change of heading and rate of change of roll angle in which only the low frequency components of each are employed, the high frequency components thereof being attenuated.

Another object of the present invention is to provide a smooth rate of turn signal for aircraft control purposes by means of a rate gyro mounted in the aircraft at an inclined position with respect to the craft fore and aft axis such that the same is responsive both to rate of change of craft heading and rate of change of roll angle and wherein a signal generator mounted on the precession axis of the gyro is responsive to both said rates of craft movement, the resultant thereof having a leading phase characteristic with respect to craft rate of change of heading alone, and wherein this resultant signal is passed through a low pass filter having a time constant such that the undesired higher frequency components of said resultant signal are attenuated while allowing the desired low frequency components thereof to pass, the angle of inclination of the gyro being proportional to the time lag or time constant of the filter.

Other objects and advantages of the present invention not at this time more particularly enumerated will become apparent as the description of a preferred embodiment of the present invention proceeds, reference being made to the accompanying drawings wherein:

Fig. 1 is a schematic illustration of the present invention as applied to an aircraft navigation system.

Fig. 2 is a vector diagram serving to illustrate the phase lag effect of filter smoothing and the compensation of this effect; and Fig. 3 illustrates a modification of the apparatus illustrated in Fig. 1.

As stated, the navigation system disclosed in Fig. 1 is of the type shown in the above-mentioned patents wherein signals proportional to the displacement of an aircraft from a radio-defined path and signals proportional to the rate of change and acceleration of said displacement are provided for enabling the craft to be flown asymptotically toward the radio beam when controlled in accordance with said signals. The system functions as a computer to compute the dynamic equation of craft motion, and employs the foregoing signals as instantaneous values of the terms of the equation, providing an output which then serves to provide an indication to the pilot of the correct attitude of the craft to satisfy such equation at any particular instant. If the instantaneous solution of the equation is satisfied all terms thereof will ultimately be reduced to zero, thereby providing the correct navigation information for the craft. In other words, the system herein used, for exemplary purposes, furnishes information to the pilot whereby he knows exactly how much correction in attitude should take place in order to cause the craft to approach asymptotically and thereafter maintain the desired flight path.

As pointed out above, in the system of my above mentioned patents, craft rate of turn signal is obtained from a vertical gyroscope which measures craft bank angle. This bank angle signal while being generally proportional to craft rate of turn is valid only if the turn is properly coordinated and the airspeed is maintained substantially constant. Furthermore, the vertical gyro required for measuring craft bank angle is not only relatively expensive but is also rather large and bulky as compared with, for example, a rate gyro. Therefore, in accordance with an object of the present invention the vertical gyro is eliminated and a heading rate signal is generated by means of a rate of turn gyro, which measures craft heading rate directly and therefore provides an accurate measure of rate of turn for use in the navigation system described for all airspeeds and bank angles.

Referring now to Fig. 1, a conventional navigation receiver 10 such as a receiver capable of receiving standard ILS localizer signals or VOR signals or the like, provides a direct current signal proportional to the horizontal displacement or lateral displacement of the craft from a radio-defined flight path. This signal is modulated and amplified in a suitable modulator amplifier 11 the output of which is fed to a conventional signal limiting device 12 and also to a lag compensated radio rate signal generating device 13. The limiter 12 is provided to prevent the displacement signal from obtaining complete control of the system when the displacement of the craft from the radio-defined path is very large and the limit imposed thereby serves to determine the intercept angle that the craft makes with the radio defined path as described in detail in the second of my above mentioned patents. The lag compensated radio rate signal generating device 13 provides an output proportional to the rate of approach on the craft toward the radio beam and is preferably of the type illustrated in the above noted application Serial No. 336,668. The output of the latter device is combined with the output of limiter 12 and limited as by a conventional limiter 14, the output of which is fed to a summing amplifier 15. In amplifier 15 the signal representing the sum of the displacement and displacement rate of the craft with respect to the beam is algebraically combined with a signal representative of the acceleration of the craft with respect to the beam. In accordance with the teachings of the present invention this latter signal is derived by a device which is directly responsive to and provides a measure of the actual rate of change of craft heading rather than by a device which senses roll angle as in my above-mentioned patents. This rate of change of heading of the craft is proportional to the acceleration of the craft with respect to the beam. Thus, the output of amplifier 15 is proportional to the sum of beam rate, displacement, and acceleration and is applied through a suitable demodulator 16 to a conventional D. C. meter movement 17 which in turn positions the vertical needle 18 or pointer of an indicating device 19 to indicate any departure of the craft from the desired asymptotic approach path. The meter 19 is preferably of the type described in my above mentioned patents. Thus, by controlling the craft to keep the algebraic sum of the foregoing terms equal to zero, the pilot will cause the craft to fly an asymptotic approach path toward the radio-defined beam and thereafter to cause the craft to be maintained on the beam.

As in the above noted patents, the apparatus illustrated in Fig. 1 may be used for cross country dead reckoning navigation of the aircraft wherein no radio ground track defining means is employed. Under such conditions accurate headings may be maintained and new headings may be asymptotically approached and thereafter maintained by simply maintaining the indicator 18 at a zero deflected position. For this purpose a switch 20 is provided for switching out the radio navigation receiver 10 and the radio rate unit 13 and in its place inserting a heading signal derived from any conventional heading signal source 21. Preferably this heading signal source is of the form described in either of my above mentioned Patents 2,613,350 or 2,613,352 and comprises, generally, a gyro magnetic compass 50 having a suitable signal generator such as a synchro 51 which supplies a signal representative of the heading of the aircraft relative to the magnetic north. For enabling a desired heading to be preselected, a further signal generator such as synchro 52, is provided. The stator of synchro 52, is connected to receive the signal from synchro 51 and the rotor thereof is positioned as by heading selector knob 53 to a desired heading which may be indicated by a suitable calibrated dial. Thus, if it is desired to change the heading of the craft from the heading on which it is flying, the pilot selects the desired new heading on heading selector 53 and a turn command signal representative of the error or difference between the existing heading and the desired heading is generated in the stator of synchro 52 and when the actual heading of the craft, as measured by gyro 50 and synchro 51, corresponds to that selected, the output of synchro 52 is reduced to zero.

In the illustrated embodiment of the present invention a rate gyroscope is employed as a device for measuring the rate of change of heading of the craft although it will be understood that other forms of rate measuring devices may be used. It is desirable in regards to aircraft performance to render the gyro quite responsive to craft heading rates. However, under such conditions of low restraint and low damping the gyro is extremely sensitive to high frequency noise i. e. to random perturbations in craft heading rates produced by wind gusts and the like. These high frequency perturbations or noise may be removed if the signal output of the gyro is passed through a filtering device such as a low pass filter. Unfortunately, however by passing the output signal of the gyro through such a low pass filter the time lag produced by the filtering action thereof impairs the usefulness of the signal. However, in accordance with the teachings of the above noted application the lag of the filter may be compensated for by deriving a signal having a leading phase characteristic with respect to the noisy primary signal. In the apparatus of the present invention this source of leading signals may be obtained by inclining the precession axis of the rate gyro in the plane including the craft longitudinal and vertical axes, thus rendering the gyro sensitive both to craft rate of change heading and craft rate of change of roll angle, the latter signal being proportional to the acceleration of craft heading. This added signal component is therefore filtered through the same filter as the heading rate signal and is used to compensate for the lag in the filter.

Accordingly, I have replaced the vertical gyro of my above noted patents with a rate gyro indicated generally at 25 which comprises a rotor 26 mounted in a gimbal 27 for spinning about a normally athwartship axis $y$. The gimbal 27 in turn is pivotally supported in the craft for precession about an axis $p$ inclined at an angle $\theta$ in the vertical plane defined by longitudinal craft axis $x$ and the vertical axis $z$. Restraining springs 28 acting between gimbal 27 and the aircraft frame 29 are selected such that the gyro has a relatively high sensitivity or response to craft rates of turn and rates of roll. Mounted on the precession axis $p$ of rate gyro 25 is a suitable pick off device or signal generator 30 which may be the selsyn type which supplies an output signal proportional to the magnitude and direction of the precession of gimbal ring 27 in response to craft rates of turn and rates of roll. Suitable damping of the gyro may be provided by means not shown having a relatively light damping characteristic i. e. an amount sufficient to render the gyro insensitive to very high frequency rates such as those produced by craft vibration.

Thus, with gyro 25 mounted in the aircraft in the position illustrated in Fig. 1, it is responsive both to the rate of change of heading of the craft and also to the rate of roll of the aircraft, the rate of roll responsiveness being dependent upon the angle of inclination $\theta$ of the precession axis $p$. Also, the signal generator 30 provides a signal having components proportional to both of these craft rates. The output of signal generator 30 appearing at lead 31 is applied, after demodulation by suitable demodulator 31', to the input of low pass filter 32. Low pass filter 32 is preferably of the RC type the values of R and C being selected such as to have a time constant that will pass only the desired low frequency components of the composite rate of turn signal and will suppress or attenuate the undesired high frequency components thereof.

The output of low pass filter 32 is modulated as by suitable modulator 32', and applied to the inputs of A. C. mixing amplifier 15 through lead 33. The input signal to amplifier 15 proportional to beam acceleration, in the case of a beam approach, or to heading rate, in the case of a dead reckoning flight, is a smoothed version of a generally noisy rate of turn signal having the required 90° phase relation with respect to the heading signal from the source 21 and 180° phase relation with respect to the signal derived from a localizer receiver 10.

It will be understood that the term "phase" as used in the present discussion is used in a sense that in a servo system where a signal is provided to represent the rate of change of the displacement of an object from a desired condition, such a rate signal is said to have a leading phase, system-wise, relative to the phase of the signal representing the displacement itself. Likewise, a signal representing the rate of change of the rate signal, i. e. an acceleration signal is said to have a phase, system-wise, which is 180° displaced from the signal representing the displacement signal. Hence, where a system is designed to use a displacement signal and its time derivatives, such as rate and acceleration, these derivative signals are useful as such only when they have the proper leading phase relation with respect to the displacement signal. If the derivative signals have any other than a desired phase relation their usefulness decreases.

From inspection of Fig. 2 it will be seen that for compensation of the lag produced by filter 32 the proper amount of heading acceleration or roll rate signal must be used; specifically, the amount of roll rate signal in the composite signal from pick off 30 is determined by the phase lag produced by the filter 32. In other words, the angle $\theta$ that the precession axis $p$ makes with the fore and aft axis $x$ of the aircraft is related to or is a function of the lag $\theta'$ produced by the filter 32.

Since the relation between roll rate and heading acceleration depends upon air speed, compensation would occur only at one air speed for any particular angle of inclination $\theta$ of the gyro precession axis.

In Fig. 1 the gyro 25 is shown as being inclined at a fixed angle. Under this condition the amount of lag compensation signal available at extreme low and high air speeds for many representative aircrafts would vary between .65 and 1.35 respectively of that required for exact compensation. It has been found that the operation of the craft under these conditions is completely satisfactory. Where exact compensation is desired the angle of tilt of the gyro 25 may be continuously varied in accordance with the air speed of the craft. Such a modification is shown in Fig. 3 wherein the gimbal 27 is pivotally supported in a frame 35, the frame in turn being pivotally mounted in the craft for rotation in about the craft athwartship or $y$ axis. The frame 35 may be continuously positioned as a function of craft air speed by means of a conventional follow-up servo loop coupled between the gimbal 35 and a means responsive to craft air speed such as a conventional air speed sensor 36. Since the heading rate sensitivity should be increased with increasing air speed the angle $\theta$ should likewise be increased with increasing air speeds so that more roll rate or heading acceleration signal will be generated in pick off 30 with increasing craft speeds.

In some applications it may be desirable to compensate the output of rate gyro 25 for errors in the rate of turn measure which are produced by banking of the craft since gyro 25 is unstabilized and measures rate of yaw rather than space rate of turn. For this purpose a vertical accelerometer 55 which provides an output in accordance with accelerations of said aircraft along the craft's vertical axis may be employed, the output of which is used to energize the signal pick-off 30 in the manner disclosed in U. S. Patent No. 2,602,239 to Wrigley, which patent is assigned to the same assignee as the present invention.

Since many changes could be made in the above construction and many apparently widely different embodiments of this invention could be made without departing from the scope thereof it is intended that all matter contained in the above description or shown in the accompanying drawings shall be interpreted as illustrative and not in a limiting sense.

What is claimed is:

1. A navigation system for aircraft comprising means for providing a first signal the representative of the difference between an existing craft heading and a selected heading, means for providing a second signal proportional to the rate of change of craft heading, said second signal providing means comprising means for measuring the rate of change of heading and the rate of roll of said craft and for supplying signal components proportional thereto, said signal components including both the high and low frequencies of both of said craft rates, means responsive to said signal components for providing an output signal proportional only to the low frequency components thereof, said output signal constituting said second signal, and means responsive to said first and second signals for providing a craft control signal varying in accordance with the algebraic sum thereof.

2. In a craft navigation system, the combination comprising a rate of turn responsive device mounted in said aircraft in such a position that it is responsive both to the rate of change of craft heading and the rate of change of craft roll angle, signal generating means coupled therewith for providing a signal having components proportional to said rate of heading and rate of roll of said craft, said rate of turn responsive means and said signal generating means being sensitive to both the desired low frequency components and the undesired high frequency components of said rates of craft movement, a low-pass filter connected to said signal generating means and responsive to the signal produced thereby for passing said low frequency components and for attenuating said high frequency components of said signal, the mounting position of said device being related to the time constant of said filter.

3. Apparatus for providing a measure of the rate of change of heading of an aircraft comprising a rate of turn gyroscope mounted in said aircraft with its axis of precession inclined in a plane including the craft's longitudinal and vertical axes whereby said gyro is responsive both to the heading rate and the roll rate of the craft, the restraining force on said gyro being such that it will have a rapid response to said rates of craft movements, a signal generator means mounted on said precession axis for providing a signal having components proportional to both heading rate and roll rate, said components including both the high and low frequencies of said rates of craft movements, and a low-pass filter connected to receive the signal produced by said signal generator for providing an output signal including only the low frequency components thereof, the angle of inclination of said gyro being proportional to the time constant of said filter whereby said output signal provides a measure of the rate of change of heading of said craft having a high response and at the same time a high degree of stability.

4. Apparatus as set forth in claim 3 wherein said rate of turn gyroscope is mounted in said aircraft so that its angle of inclination is adjustable, and means responsive to the air speed of said aircraft for adjusting said angle of inclination.

5. Apparatus as set forth in claim 3 further including means responsive to accelerations of said aircraft along the craft's vertical axis, and means responsive to said last mentioned means for modifying the signal output of said signal generating means.

6. A navigation system for aircraft comprising means for supplying a signal proportional to the displacement of the craft from a radio-beam-defined course, means for providing a signal proportional to the rate of approach of said craft toward said course, means for providing a signal porportional to the acceleration of said craft toward said course including means responsive to the rate of change of craft heading and for producing a signal proportional thereto, said last-mentioned means being responsive both to the desired low frequency components of heading rate and the undesired high frequency components thereof and said signal proportional thereto also including said frequency components, filter means connected to receive said signal and having a time constant such that said desired low frequency components will be passed and said undesired high frequency components will be attenuated, said heading rate responsive means being mounted in a position in said aircraft such that it will also respond to rates of craft roll, the mounting position of said rate responsive means being related to the time constant of said filter, and means responsive to said displacement, rate, and acceleration signals for supplying an output signal in accordance with the algebraic sum thereof.

7. A navigation system as set forth in claim 6 wherein said means responsive to the rate of change of craft heading comprises a rate of turn gyroscope having its precession axis positioned in said craft in an inclined orientation in the plane defined by the craft fore-and-aft and vertical axes, the angle of inclination thereof being proportional to the time constant of said filter.

References Cited in the file of this patent

UNITED STATES PATENTS

| 1,958,258 | Alexanderson | May 8, 1934 |
| 2,548,278 | Wirkler | Apr. 10, 1951 |